US012783379B2

(12) United States Patent
Kling et al.

(10) Patent No.: US 12,783,379 B2
(45) Date of Patent: Nov. 3, 2026

(54) SYSTEM AND METHOD FOR AN INTEGRATED INFRASTRUCTURE DATA MONITORING FRAMEWORK

(71) Applicant: BANK OF AMERICA CORPORATION, Charlotte, NC (US)

(72) Inventors: John H. Kling, Alexandria, VA (US); Charles Dudley, Concord, NC (US); Jason Yeung, Forest Hills, NY (US); Jordan Lasher, Dallas, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 38 days.

(21) Appl. No.: 18/939,048

(22) Filed: Nov. 6, 2024

(65) Prior Publication Data

US 2026/0127085 A1 May 7, 2026

(51) Int. Cl.
*G06F 11/34* (2006.01)
*G06F 11/30* (2006.01)

(52) U.S. Cl.
CPC ...... *G06F 11/3409* (2013.01); *G06F 11/3006* (2013.01); *G06F 11/3476* (2013.01)

(58) Field of Classification Search
CPC ............. G06F 11/4006; G06F 11/3476; G06F 11/3409
See application file for complete search history.

(56) References Cited

U.S. PATENT DOCUMENTS 8,285,836 B2 * 10/2012 Haga .................. G06F 11/3495 709/224
8,712,950 B2 * 4/2014 Smith ................ G06F 11/3466 706/52
9,185,188 B1 * 11/2015 Li .......................... H04L 67/62
9,391,866 B1 * 7/2016 Martin ................ H04L 41/0681
2007/0208920 A1 * 9/2007 Tevis ..................... G06F 3/067 709/224
2019/0260688 A1 * 8/2019 Anand .................... G06F 17/18
2021/0342337 A1 * 11/2021 Lu ......................... G06F 11/324
2022/0004477 A1 * 1/2022 Dahl ...................... G06F 11/302
2022/0318082 A1 * 10/2022 Slinger ............... G06F 11/3409

OTHER PUBLICATIONS

Machado, Carla G. "Developing a Sustainable Operations Maturity Model (SOMM." 22nd International Conference on Production Research. (Year: 2013).*

* cited by examiner

*Primary Examiner* — John M Macilwinen
(74) *Attorney, Agent, or Firm* — Moore & Van Allen PLLC; Nicholas C. Russell

(57) ABSTRACT

A system is provided for an integrated infrastructure data monitoring framework. In particular, the system may comprise an integrated monitoring framework that may be implemented to assess the monitoring and maturity of the monitoring for the computing resources in the network environment. The framework may comprise a conceptual model that may provide a common language for the monitoring of computing resources. The framework may further comprise an operational monitoring model that may allow an entity to assess the system's monitoring at a single point in time and over time, as well as the maturity of such monitoring capabilities both at a single point in time as well as over a period of time. Furthermore, the framework may comprise an operational monitoring assessment service that may implement the operational monitoring model in the network environment.

20 Claims, 5 Drawing Sheets

SYSTEM AND METHOD FOR AN INTEGRATED INFRASTRUCTURE DATA MONITORING FRAMEWORK

TECHNOLOGICAL FIELD

Example embodiments of the present disclosure relate to a system for an integrated infrastructure data monitoring framework.

BACKGROUND

There is a need for an intelligent and efficient way to reduce data storage requirements within a network environment.

BRIEF SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

A system is provided for an integrated infrastructure data monitoring framework. In particular, the system may comprise an integrated monitoring framework that may be implemented to assess the monitoring and maturity of the monitoring for the computing resources in the network environment. The framework may comprise a conceptual model that may provide a common language for the monitoring of computing resources. The framework may further comprise an operational monitoring model that may allow an entity to assess the system's monitoring at a single point in time and over time, as well as the maturity of such monitoring capabilities both at a single point in time as well as over a period of time. Furthermore, the framework may comprise an operational monitoring assessment service that may implement the operational monitoring model in the network environment. In this way, the system may provide a way to ensure uniformity, comprehensiveness, and consistency in the monitoring of computing resources within a network environment across various dimensions.

Accordingly, embodiments of the present disclosure provide a system for an integrated infrastructure data monitoring framework, the system comprising: a processing device;

a non-transitory storage device containing instructions when executed by the processing device, cause the processing device to perform the steps of: identifying one or more monitoring objects within a network environment, wherein the one or more monitoring objects comprise at least one of a computing resource or process; generating one or more operational monitoring indicators based on generating one or more associations between the one or more monitoring objects and one or more operational monitoring metrics; populating a data object with the one or more operational monitoring indicators, wherein the data object comprises a plurality of entries along a first dimension corresponding to one or more operational monitoring metric aspects associated with the one or more monitoring objects, wherein the data object further comprises a plurality of entries along a second dimension corresponding to one or more target layers associated with the one or more monitoring objects; computing a monitoring score for each combination of the one or more operational monitoring metric aspects along the first dimension and the one or more target layers along the second dimension; and generating an assessment of monitoring of the one or more monitoring objects at a point in time.

In some embodiments, the instructions, when executed by the processing device, further cause the processing device to generate an assessment of monitoring of the one or more monitoring objects over time based on analyzing a plurality of assessments of monitoring of the one or more monitoring objects at a point in time.

In some embodiments, executed by the processing device, further cause the processing device to generate an assessment of monitoring maturity associated with the one or more monitoring objects at a point in time.

In some embodiments, executed by the processing device, further cause the processing device to generate an assessment of monitoring maturity associated with the one or more monitoring objects over time based on analyzing a plurality of assessments of monitoring maturity associated with the one or more monitoring objects at a point in time.

In some embodiments, the one or more operational monitoring metric aspects comprise availability, capacity, performance, and integrity.

In some embodiments, the one or more target layers comprise one or more categories associated with the one or more monitoring objects, wherein the one or more categories comprise a device category, a network category, a data category, an application category, and a process category.

In some embodiments, the data object is a relational database table, wherein the first dimension is a first axis of the relational database table, wherein the second dimension is a second axis of the relational database table.

Embodiments of the present disclosure also provide a computer program product for an integrated infrastructure data monitoring framework, the computer program product comprising a non-transitory computer-readable medium comprising code causing an apparatus to perform the steps of: identifying one or more monitoring objects within a network environment, wherein the one or more monitoring objects comprise at least one of a computing resource or process; generating one or more operational monitoring indicators based on generating one or more associations between the one or more monitoring objects and one or more operational monitoring metrics; populating a data object with the one or more operational monitoring indicators, wherein the data object comprises a plurality of entries along a first dimension corresponding to one or more operational monitoring metric aspects associated with the one or more monitoring objects, wherein the data object further comprises a plurality of entries along a second dimension corresponding to one or more target layers associated with the one or more monitoring objects; computing a monitoring score for each combination of the one or more operational monitoring metric aspects along the first dimension and the one or more target layers along the second dimension; and generating an assessment of monitoring of the one or more monitoring objects at a point in time.

In some embodiments, the code further causes the apparatus to generate an assessment of monitoring of the one or more monitoring objects over time based on analyzing a plurality of assessments of monitoring of the one or more monitoring objects at a point in time.

In some embodiments, the code further causes the apparatus to generate an assessment of monitoring maturity associated with the one or more monitoring objects at a point in time.

In some embodiments, the code further causes the apparatus to generate an assessment of monitoring maturity associated with the one or more monitoring objects over time based on analyzing a plurality of assessments of monitoring maturity associated with the one or more monitoring objects at a point in time.

In some embodiments, the one or more operational monitoring metric aspects comprise availability, capacity, performance, and integrity.

In some embodiments, the one or more target layers comprise one or more categories associated with the one or more monitoring objects, wherein the one or more categories comprise a device category, a network category, a data category, an application category, and a process category.

Embodiments of the present disclosure also provide a computer-implemented method for an integrated infrastructure data monitoring framework, the computer-implemented method comprising: identifying one or more monitoring objects within a network environment, wherein the one or more monitoring objects comprise at least one of a computing resource or process; generating one or more operational monitoring indicators based on generating one or more associations between the one or more monitoring objects and one or more operational monitoring metrics; populating a data object with the one or more operational monitoring indicators, wherein the data object comprises a plurality of entries along a first dimension corresponding to one or more operational monitoring metric aspects associated with the one or more monitoring objects, wherein the data object further comprises a plurality of entries along a second dimension corresponding to one or more target layers associated with the one or more monitoring objects; computing a monitoring score for each combination of the one or more operational monitoring metric aspects along the first dimension and the one or more target layers along the second dimension; and generating an assessment of monitoring of the one or more monitoring objects at a point in time.

In some embodiments, the computer-implemented method further comprises generating an assessment of monitoring of the one or more monitoring objects over time based on analyzing a plurality of assessments of monitoring of the one or more monitoring objects at a point in time.

In some embodiments, the computer-implemented method further comprises generating an assessment of monitoring maturity associated with the one or more monitoring objects at a point in time.

In some embodiments, the computer-implemented method further comprises generating an assessment of monitoring maturity associated with the one or more monitoring objects over time based on analyzing a plurality of assessments of monitoring maturity associated with the one or more monitoring objects at a point in time.

In some embodiments, the one or more operational monitoring metric aspects comprise availability, capacity, performance, and integrity.

In some embodiments, the one or more target layers comprise one or more categories associated with the one or more monitoring objects, wherein the one or more categories comprise a device category, a network category, a data category, an application category, and a process category.

In some embodiments, the data object is a relational database table, wherein the first dimension is a first axis of the relational database table, wherein the second dimension is a second axis of the relational database table.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
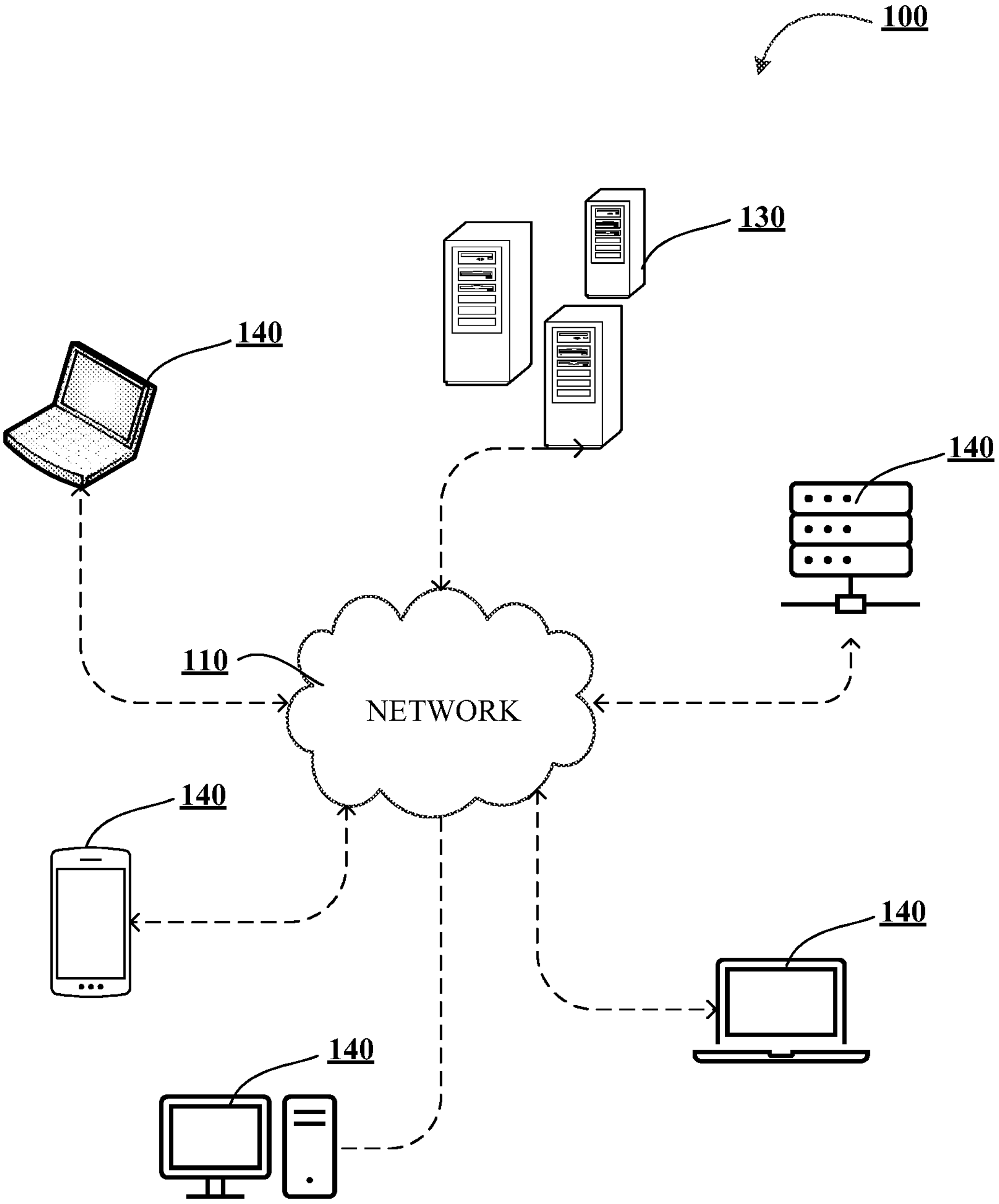
Figure 1B:
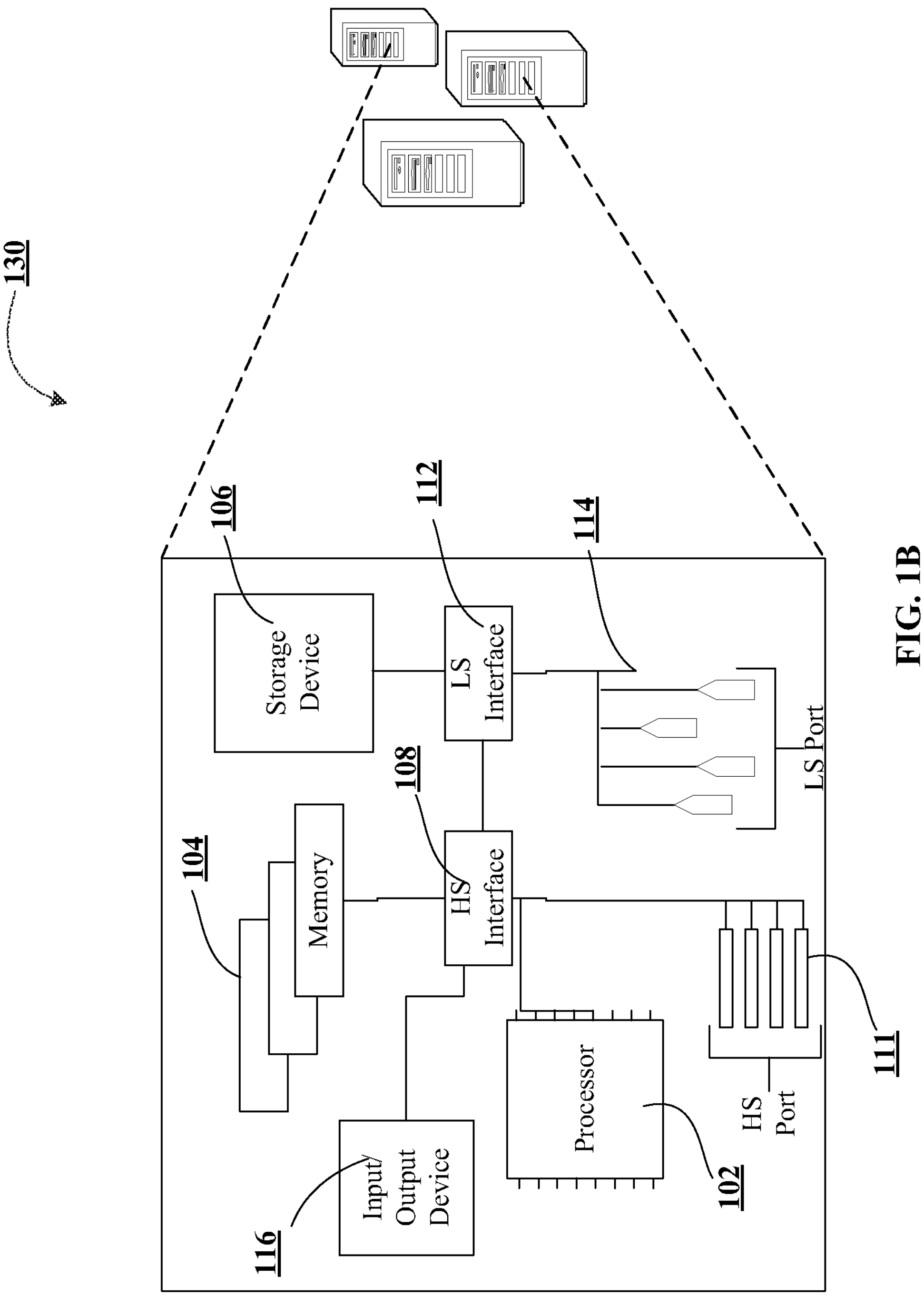
Figure 1C:
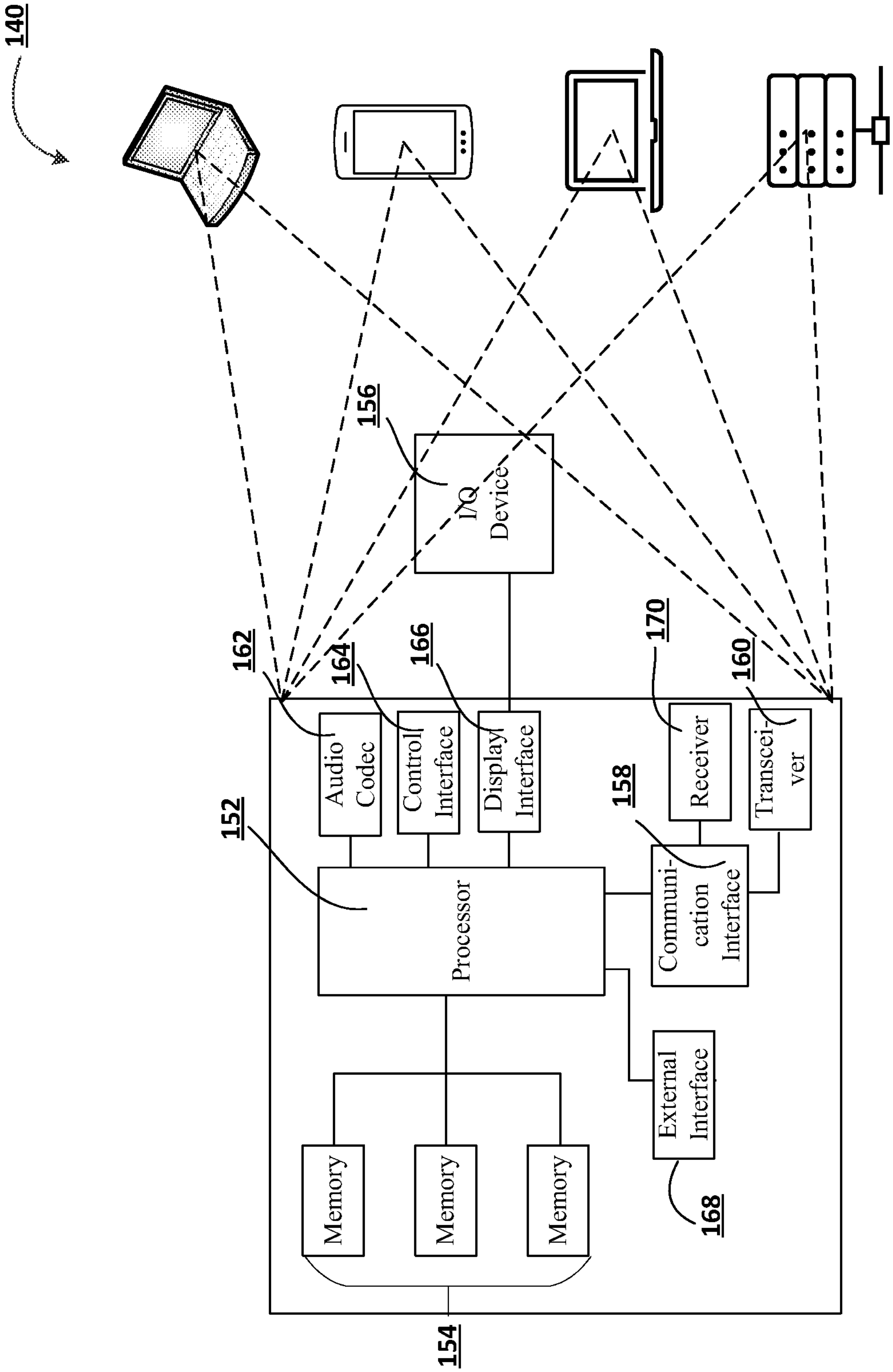
Figure 2:
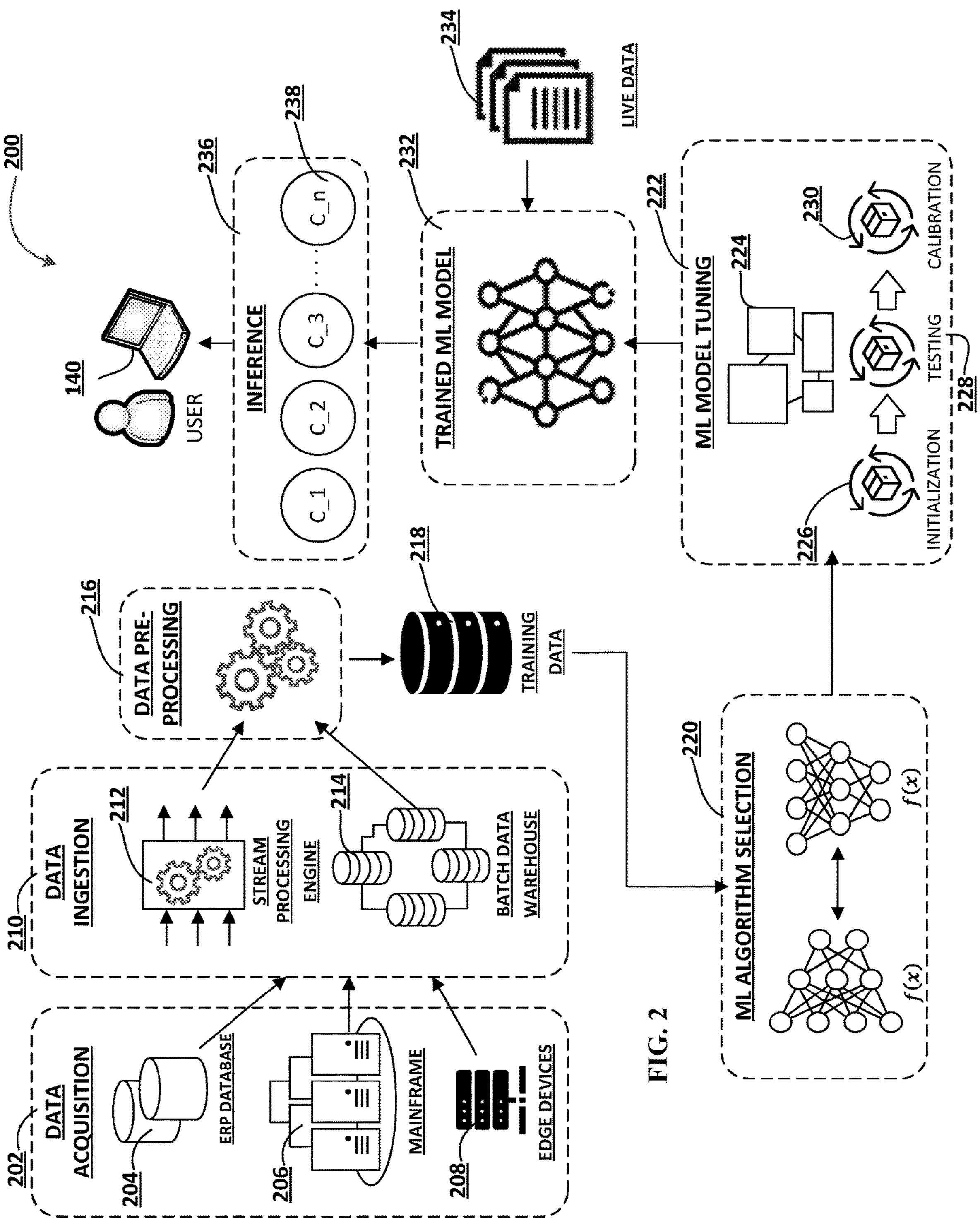
Figure 3:
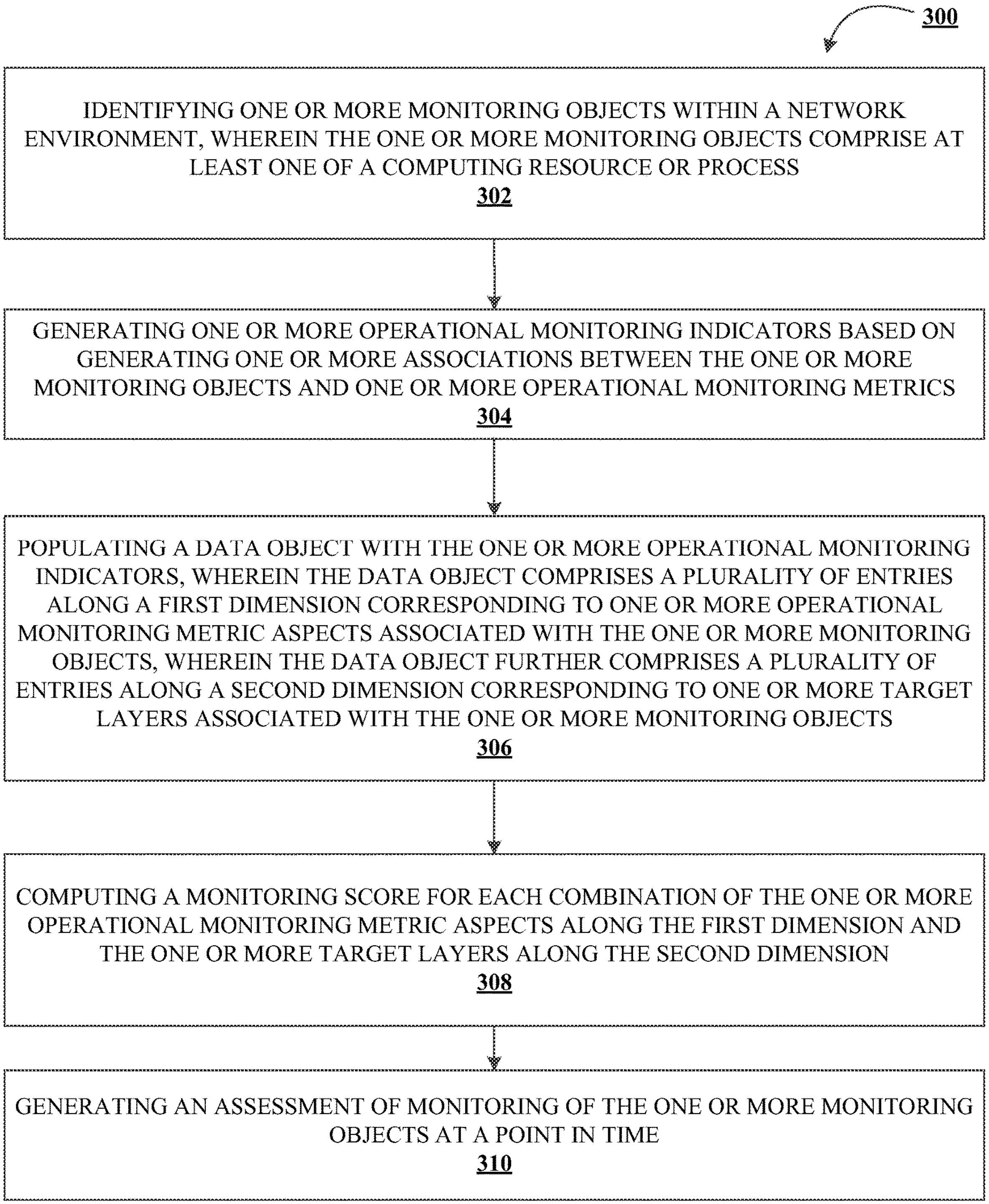

FIGS. 1A-1C illustrates technical components of an exemplary distributed computing system for an integrated infrastructure data monitoring framework, in accordance with an embodiment of the disclosure;

FIG. 2 illustrates an exemplary machine learning subsystem architecture, in accordance with an embodiment of the invention; and FIG. 3 illustrates a method for an integrated infrastructure data monitoring framework, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term “a” and/or “an” shall mean “one or more,” even though the phrase “one or more” is also used herein. Furthermore, when it is said herein that something is “based on” something else, it may be based on one or more other things as well. In other words, unless expressly indicated otherwise, as used herein “based on” means “based at least in part on” or “based at least partially on.” Like numbers refer to like elements throughout.

As used herein, an “entity” may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a “user” may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, unique characteristic information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, "resource" may refer to a tangible or intangible object that may be used, consumed, maintained, acquired, exchanged, and/or the like by a system, entity, or user to accomplish certain objectives. Accordingly, in some embodiments, the resources may include computing resources such as processing power, memory space, network bandwidth, bus speeds, storage space, electricity, and/or the like. In other embodiments, the resources may include objects such as electronic data files or values, authentication keys (e.g., cryptographic keys), document files, funds, digital currencies, and/or the like.

A modern entity's network environment may be highly complex and large, comprising multiple heterogenous computing resources that may include various computing devices, servers, applications, databases, networks, and/or the like. As the network increases in size and complexity, it becomes increasingly difficult not only to monitor the computing resources in the network environment, but also to assess the monitoring and maturity of the monitoring. For instance, a failure of a monitoring control may cause a cascading effect that may affect multiple other resources downstream of the failed resource. Accordingly, there is a need for a consistent way to view the monitoring currently in place, identify the gaps and/or overlaps in the monitoring, and assess the maturity of the monitoring.

To address the above concerns among others, the system may provide an integrated monitoring framework ("IMF" or "framework") that, once implemented, may provide a unified view of the monitoring controls in place within a network environment as well as a way to assess the monitoring capabilities and maturity of the monitoring. In this regard, the framework may comprise 1) a conceptual model, which is the common language and model for monitoring computing resources; 2) an operational monitoring model, which is a common, integrated approach for assessing the state and maturity of operational monitoring both at a single point in time and over a period of time; and 3) an operational monitoring assessment service, which may be an implementation of the operational monitoring model (e.g., an application). A more detailed discussion of the components of the framework follows.

I. IMF Conceptual Model

The IMF Conceptual Model may provide a way to organize and/or categorize various aspects of monitoring and alerting in both an operational and security context. The model may comprise a plurality of subject areas that may define various facets of the framework, as provided below.

1. Monitoring and Alerting

The Monitoring and Alerting subject area may provide an overview of operational monitoring and alerting, which may include details regarding topics such as monitoring objects, monitoring metrics, monitoring indicators (e.g., associations between monitoring metrics and the monitoring objects), reporting categories, alert thresholds, potential automated responses based on certain predefined conditions, and/or the like. In this regard, an alerting application may evaluate alerts generated from other applications and determine (e.g., using an artificial intelligence driven process) whether the alert should be escalated to an incident. Upon detecting that the alert should be escalated, the alerting application may pass the incident to an incident management application.

2. Operational and Security Monitoring

The Operational and Security Monitoring subject area may comprise information regarding the various types of monitoring (e.g., operational monitoring and security monitoring). In this regard, operational monitoring may be a control process that gathers metrics from computing resources or processes to ensure normal operation or functionality and to detect and resolve issues based on monitoring certain metrics (e.g., availability, capacity, performance, and security incidents), which may in turn facilitate IT management processes such as incident management, problem management, availability management, capacity and performance management, information security management, service continuity management, configuration management, deployment management, and change enablement.

Security monitoring may be a control process that involves collecting and analyzing information to detect suspicious activities associated with computing resources (e.g., unauthorized changes to settings or data, hardware configurations, suspicious or abnormal behavior, and/or the like), define the types of activities that should trigger alerts, and to take remedial actions in response to triggered alerts.

3. Operational and Security Monitoring Targets

The Operational and Security Monitoring Targets subject area may comprise information regarding some of the objects or targets for operational and/or security monitoring. For instance, examples of such targets may include computing resources or processes such as computing devices, applications, data, servers, network devices, databases, services, and/or the like.

4. Operational Maturity Model

The Operational Maturity Model ("OMM") subject area may comprise a model for assessing an organization's operational monitoring maturity with respect to the computing resources within the network environment. In this regard, the system may perform an assessment of both monitoring of computing resources at a point in time as well as over time, and also perform an assessment on the maturity of the monitoring both at a point in time as well as over time. The OMM will be discussed in additional detail below.

5. OMM Technology Layer

The OMM Technology Layer subject area may expand on the OMM by detailing the association between monitoring targets and the broader GIM taxonomy. The OMM Technology Layer may provide a framework for analyzing how monitoring targets—whether they relate to devices, data, applications, or processes—fit within the larger monitoring structure. By categorizing these targets into structured taxonomies, organizations may gain a more granular understanding of the monitoring landscape, potentially improving insights into operational and security status.

II. IMF Operational Monitoring Model ("OMM")

The system may conduct its assessments based on various metrics or parameters across one or more dimensions. For instance, in one embodiment, the assessments may be executed based on one or more metrics across a first dimension, where such metrics may include the OMM Aspects (e.g., availability, capacity, performance, and integrity) and one or more categories or parameters across a second dimension, where the one or more categories or parameters may include OMM Target Layers (e.g., Device, Network, Data, Application, and Process).

An overview of the various OMM Aspects follows. "Availability" as used herein may refer to an attribute indicating whether a computing resource or process is able to fulfill its function over a period of time or at a given time.

"Capacity" as used herein may refer to the maximum amount a computing resource or process can produce or the resource can contain.

"Performance" as used herein may refer to the amount of useful work accomplished by a computing resource or process compared to the time consumed in performing the work.

"Integrity" as used herein may refer to a security principle that ensures data (e.g., configuration items) are modified only by authorized users and/or processes, which may include guarding against improper modification, access, destruction, and/or the like (e.g., due to software and/or hardware failure, tampering, environmental events, access by unauthorized users, and/or the like).

An overview of the various OMM Target Layers follows. "Device" as it relates to the OMM Target Layers may refer to a reporting category to categorize monitoring objects and operational monitoring indicators, and can thus include various types of devices (e.g., servers, user devices, routers, endpoint devices, and/or the like). It should be understood that any one device, application, process, and/or the like may be assigned multiple categories as may be applicable.

"Network" as it relates to the OMM Target Layers may refer to a reporting category for categorizing monitoring objects and operational monitoring indicators as they relate to networking, where such categories may include network devices, network applications, network data, and/or the like.

"Data" as it relates to the OMM Target Layers may refer to a reporting category for categorizing monitoring objects and operational monitoring indicators as they relate to all data forms and data usages, encompassing both logical and physical data. Such data may include, for instance, device configuration data, application configuration data, data "in-flight" within a network, data stored within storage devices, and/or the like.

"Application" as it relates to the OMM Target Layers may refer to a reporting category for categorizing monitoring objects and operational monitoring indicators as they relate to various types of applications, which may include networking applications (which may also be categorized under "Network"). The Application layer, as with the other Target Layers, may be sub-categorized into smaller sub-categories (e.g., application components) to add further granularity.

"Process" as it relates to the OMM Target Layers may refer to a reporting category for categorizing monitoring objects and operational monitoring indicators as they relate to various types of processes that may be running within an entity's network environment.

The various one or more parameters may be subdivided into sub-categories. For instance, the "Device" target layer may be subdivided into various types of devices (e.g., Servers, Network Devices, Endpoint Devices, and/or the like). In some embodiments, the sub-categories may further be divided into sub-categories (e.g., Servers may be divided into Mainframe Devices and Mid-Range Devices). It should be understood that additional divisions of the categories and/or sub-categories may be configurable by the system. In some embodiments, the assessment may comprise generating a table (e.g., a relational database) or spreadsheet where the metrics across the first dimension are represented on the "X" axis and the one or more categories across the second dimension are represented on the "Y" axis. In such an embodiment, each cell within the table or spreadsheet may comprise one or more operational monitoring indicators, which is the association between a monitoring object (e.g., the computing resource being monitored) and an operational monitoring metric. For example, the target to be monitored may be a component of a computing device, such as a CPU of a host device (which may be referred to by an identifier such as "Hostname"). The metric to be monitored may be "CPU utilization %". As such, the operational monitoring indicator may be an association such as "Hostname/CPU=>CPU Utilization %" that may be placed within the cell corresponding to the target layer (e.g., Devices) and the relevant OMM Aspect (e.g., Capacity).

In some embodiments, each cell may comprise a plurality of operational monitoring indicators. Based on the values of the one or more operational monitoring indicators within the table or spreadsheet, the system may compute a monitoring score for each combination of an OMM Aspect and OMM target layer. In some embodiments, the monitoring score may be a composite score of the one or more operational monitoring indicators within each cell. In this regard, each operational monitoring indicator may be assigned a weight based on its relevant importance to the system's monitoring capabilities. The monitoring scores may represent assessments of operational monitoring at a point in time, where each table or spreadsheet may represent the state of monitoring at a single point in time. Accordingly, by analyzing multiple tables or spreadsheets, the system may perform a trend analysis of monitoring over a period of time defined by the number of tables or spreadsheets analyzed by the system.

The system may further assess the monitoring maturity at a point in time. In this regard, the system may determine monitoring maturity based on 1) the number of monitoring indicators in each cell; 2) the sum of the values of the one or more monitoring indicators in each cell; 3) the number of cells as defined by the granularity of the target layers (e.g., the number of subcategories); and 4) the overall coverage computed based on the number of cells that have multiple monitoring indicators with high indicator values across all aspects applicable to each cell. In some embodiments, the system may categorize monitoring maturity according to one or more monitoring maturity levels. For instance, the monitoring maturity may be categorized into four discrete levels, as follows: OMM Maturity Level 1 may require a complete inventory of all monitoring objects for which an OMM model owner is responsible; OMM Maturity Level 2 may require at least one monitoring indicator in each cell to be at the highest level of granularity for monitoring devices for all aspects; OMM Maturity Level 3 may require at least one monitoring indicator in each cell where the lowest applicable level of granularity for each target layer is used; and OMM Maturity Level 4 may require at least two monitoring indicators in each cell where the lowest applicable levels of granularity for each target layer is used. Upon assessing monitoring maturity at a single point in time as described above, the system may analyze multiple tables or spreadsheets for which the monitoring maturity levels have been computed, thereby allowing the system to assess operational monitoring maturity across a period of time defined by the selected tables or spreadsheets.

III. IMF Operational Monitoring Assessment Service ("OMAS")

The IMF Operational Monitoring Assessment Service ("OMAS") may be an analytical application or data warehouse that utilizes the platform to implement the Operational Monitoring Maturity ("OMM") model. The OMAS may comprise a number of components, such as an extension to the platform's Logical Data Model ("LDM") to incorporate entities and attributes for describing the OMM, as well as an architectural model detailing the operational monitoring tools in use, where the architectural model may comprise descriptions of the tools, including the types of monitoring conducted, monitoring objects and metrics associated with the objects, monitoring indicators, and an assignment of tools monitoring indicators to an OMM Aspect and an OMM Target Level.

Furthermore, the OMAS may further comprise a physical data model representing the data generated and maintained by each operational monitoring tool and an extension to the platform database to support the tables and/or spreadsheets for implementing the OMM as structured in the platform's LDM. To facilitate data integration, the OMAS may implement an ETL (Extract, Transform, Load) design for ingesting monitoring data from each tool.

In some embodiments, the OMAS may further compromise one or more dashboards based on OMM for implementing the assessments of monitoring and monitoring maturity at a point in time, as well as analytical reports based on historical data to implement the assessment of monitoring and monitoring maturity over time.

The system as described herein provides numerous technical advantages over conventional operations monitoring systems. For instance, by setting a common framework for defining monitoring targets and metrics, the system provides a unified way to assess the state of monitoring as well as monitoring maturity at a single point in time as well as over periods of time. In turn, the system may provide the insights needed to address issues within the network's monitoring capabilities to better detect failures or errors occurring within the monitored resources, thereby ensuring expedient resolution of the detected failures or errors. Thus, the operational efficiency of the computing resources and processes within the network environment may be increased.

Turning now to the figures, FIGS. 1A-1C illustrate technical components of an exemplary distributed computing environment 100 for the system for an integrated infrastructure data monitoring framework. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. For instance, the functions of the system 130 and the endpoint devices 140 may be performed on the same device (e.g., the endpoint device 140). Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it. In some embodiments, the system 130 may provide an application programming interface ("API") layer for communicating with the end-point device(s) 140.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as servers, networked storage drives, personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102 (which may also be referred to herein as a "processing device"), memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the invention. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., C_1, C_2 . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., C_1, C_2 . . . C_n 238) live data 234 based on how similar they are to one another to solve exploratory challenges where little is known about the data, provide a description or label (e.g., C_1, C_2 . . . C_n 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates a method 300 for an integrated infrastructure data monitoring framework. As shown in block 302, the method includes identifying one or more monitoring objects within a network environment, wherein the one or more monitoring objects comprise at least one of a computing resource or process. The one or more monitoring objects may include the targets for monitoring by the system. Accordingly, the monitoring objects may comprise various types of computing resources and/or processes, such as devices, applications, databases, peripherals, data, services, system processes, and/or the like.

Next, as shown in block 304, the method includes generating one or more operational monitoring indicators based on generating one or more associations between the one or more monitoring objects and one or more operational monitoring metrics. In this regard, the metric may be a way to measure a particular aspect associated with the monitoring object, where the aspects may include availability, capacity, performance, and/or integrity. Accordingly, the operational monitoring indicators may serve as an indication of what is being monitored and/or measured, along with how the object is being monitored and/or measured.

Next, as shown in block 306, the method includes populating a data object with the one or more operational monitoring indicators, wherein the data object comprises a plurality of entries along a first dimension corresponding to one or more operational monitoring metric aspects associated with the one or more monitoring objects, wherein the data object further comprises a plurality of entries along a second dimension corresponding to one or more target layers associated with the one or more monitoring objects. In some embodiments, the data object may be a relational database table or spreadsheet. In such embodiments, the first dimension may be represented as a first axis within the data object, where the second dimension may be represented as a second axis within the data object. The one or more target layers may comprise various categories for categorizing the monitoring objects and/or monitoring indicators. Accordingly, the categories may comprise a device category, a network category, a data category, an application category, and a process category. The cells (e.g., the intersections between an entry on the first axis and an entry on a second axis) of the data object may be populated by the various operational monitoring indicators. It should be understood that a single cell may contain multiple operational monitoring indicators as needed.

Next, as shown in block 308, the method includes computing a monitoring score for each combination of the one or more operational monitoring metric aspects along the first dimension and the one or more target layers along the second dimension. The monitoring score may be computed for each cell by computing a weighted score based on the contents of the cell. In this regard, each operational monitoring indicator within each cell may be assigned a weight by the system according to the degree to which the indicator contributes to the monitoring of the monitoring object along the specified aspect.

Next, as shown in block 310, the method includes, based on the monitoring score for each combination, generating an assessment of monitoring of the one or more monitoring objects at a point in time. In some embodiments, the system may analyze multiple assessments of monitoring at a single point in time to detect trends in the monitoring capabilities of the system over a period of time. Furthermore, the system may generate an assessment of the monitoring maturity with respect to the monitoring objects at a single point in time based on factors such as the number of monitoring indicators in each cell, the total of the indicator values in each cell, the number of cells based on the granularity of the target layers, and the overall coverage based on the number of cells that have multiple monitoring indicators with high indicator values. Based on the generated assessments of monitoring maturity, the system may analyze multiple such assessments to generate an assessment of monitoring maturity over time.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, micro-code, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for an integrated infrastructure data monitoring framework, the system comprising:

a processing device;

a non-transitory storage device containing instructions when executed by the processing device, cause the processing device to perform the steps of:

identifying one or more monitoring objects within a network environment, wherein the one or more monitoring objects comprise at least one of a computing resource or process;

generating one or more operational monitoring indicators based on generating one or more associations between the one or more monitoring objects and one or more operational monitoring metrics;

populating a data object with the one or more operational monitoring indicators, wherein the data object comprises a plurality of entries along a first dimension corresponding to one or more operational monitoring metric aspects associated with the one or more monitoring objects, wherein the data object further comprises a plurality of entries along a second dimension such that the data object comprises a plurality of cells at the intersections of the plurality of entries along the first dimension and the plurality of entries along the second dimension, wherein the plurality of entries along the second dimension correspond to one or more target layers associated with the one or more monitoring objects;

computing a monitoring score for each combination of the one or more operational monitoring metric aspects along the first dimension and the one or more target layers along the second dimension;

generating an assessment of monitoring of the one or more monitoring objects at a point in time; and generating an assessment of monitoring maturity associated with the one or more monitoring objects at a point in time, wherein the assessment of monitoring maturity is based on at least one of: the number of monitoring indicators in each cell, the sum of the values of the one or more monitoring indicators in each cell, the number of cells as defined by a level of granularity of the one or more target layers, or an overall coverage metric based on the number of cells having multiple monitoring indicators with high indicator values across all aspects applicable to each cell.

2. The system of claim 1, wherein the instructions, when executed by the processing device, further cause the processing device to generate an assessment of monitoring of the one or more monitoring objects over time based on analyzing a plurality of assessments of monitoring of the one or more monitoring objects at a point in time.

3. The system of claim 1, wherein the instructions, when executed by the processing device, further cause the processing device to generate an assessment of monitoring maturity associated with the one or more monitoring objects over time based on analyzing a plurality of assessments of monitoring maturity associated with the one or more monitoring objects at a point in time.

4. The system of claim 1, wherein the one or more operational monitoring metric aspects comprise availability, capacity, performance, and integrity.

5. The system of claim 1, wherein the one or more target layers comprise one or more categories associated with the one or more monitoring objects, wherein the one or more categories comprise a device category, a network category, a data category, an application category, and a process category.

6. The system of claim 1, wherein the data object is a relational database table, wherein the first dimension is a first axis of the relational database table, wherein the second dimension is a second axis of the relational database table.

7. The system of claim 1, wherein computing a monitoring score for each combination of the one or more operational monitoring metric aspects along the first dimension and the one or more target layers along the second dimension comprises computing a weighted score, wherein each operational monitoring indicator within each cell is assigned a weight according to the degree to which the operational monitoring indicator contributes to the monitoring of each of the one or more operational monitoring aspects.

8. A computer program product for an integrated infrastructure data monitoring framework, the computer program product comprising a non-transitory computer-readable medium comprising code causing an apparatus to perform the steps of:

identifying one or more monitoring objects within a network environment, wherein the one or more monitoring objects comprise at least one of a computing resource or process;

generating one or more operational monitoring indicators based on generating one or more associations between the one or more monitoring objects and one or more operational monitoring metrics;

populating a data object with the one or more operational monitoring indicators, wherein the data object comprises a plurality of entries along a first dimension corresponding to one or more operational monitoring metric aspects associated with the one or more monitoring objects, wherein the data object further comprises a plurality of entries along a second dimension such that the data object comprises a plurality of cells at the intersections of the plurality of entries along the first dimension and the plurality of entries along the second dimension, wherein the plurality of entries along the second dimension correspond to one or more target layers associated with the one or more monitoring objects;

computing a monitoring score for each combination of the one or more operational monitoring metric aspects along the first dimension and the one or more target layers along the second dimension;

generating an assessment of monitoring of the one or more monitoring objects at a point in time; and generating an assessment of monitoring maturity associated with the one or more monitoring objects at a point in time, wherein the assessment of monitoring maturity is based on at least one of: the number of monitoring indicators in each cell, the sum of the values of the one or more monitoring indicators in each cell, the number of cells as defined by a level of granularity of the one or more target layers, or an overall coverage metric based on the number of cells having multiple monitoring indicators with high indicator values across all aspects applicable to each cell.

9. The computer program product of claim 8, wherein the code further causes the apparatus to generate an assessment of monitoring of the one or more monitoring objects over time based on analyzing a plurality of assessments of monitoring of the one or more monitoring objects at a point in time.

10. The computer program product of claim 8, wherein the code further causes the apparatus to generate an assessment of monitoring maturity associated with the one or more monitoring objects over time based on analyzing a plurality of assessments of monitoring maturity associated with the one or more monitoring objects at a point in time.

11. The computer program product of claim 8, wherein the one or more operational monitoring metric aspects comprise availability, capacity, performance, and integrity.

12. The computer program product of claim 8, wherein the one or more target layers comprise one or more categories associated with the one or more monitoring objects, wherein the one or more categories comprise a device category, a network category, a data category, an application category, and a process category.

13. The computer program product of claim 8, wherein computing a monitoring score for each combination of the one or more operational monitoring metric aspects along the first dimension and the one or more target layers along the second dimension comprises computing a weighted score, wherein each operational monitoring indicator within each cell is assigned a weight according to the degree to which the operational monitoring indicator contributes to the monitoring of each of the one or more operational monitoring aspects.

14. A computer-implemented method for an integrated infrastructure data monitoring framework, the computer-implemented method comprising:

identifying one or more monitoring objects within a network environment, wherein the one or more monitoring objects comprise at least one of a computing resource or process;

generating one or more operational monitoring indicators based on generating one or more associations between the one or more monitoring objects and one or more operational monitoring metrics;

populating a data object with the one or more operational monitoring indicators, wherein the data object comprises a plurality of entries along a first dimension corresponding to one or more operational monitoring metric aspects associated with the one or more monitoring objects, wherein the data object further comprises a plurality of entries along a second dimension such that the data object comprises a plurality of cells at the intersections of the plurality of entries along the first dimension and the plurality of entries along the second dimension, wherein the plurality of entries along the second dimension correspond to one or more target layers associated with the one or more monitoring objects;

computing a monitoring score for each combination of the one or more operational monitoring metric aspects along the first dimension and the one or more target layers along the second dimension; and generating an assessment of monitoring of the one or more monitoring objects at a point in time; and generating an assessment of monitoring maturity associated with the one or more monitoring objects at a point in time, wherein the assessment of monitoring maturity is based on at least one of: the number of monitoring indicators in each cell, the sum of the values of the one or more monitoring indicators in each cell, the number of cells as defined by a level of granularity of the one or more target layers, or an overall coverage metric based on the number of cells having multiple monitoring indicators with high indicator values across all aspects applicable to each cell.

15. The computer-implemented method of claim 14, wherein the computer-implemented method further comprises generating an assessment of monitoring of the one or more monitoring objects over time based on analyzing a plurality of assessments of monitoring of the one or more monitoring objects at a point in time.

16. The computer-implemented method of claim 14, wherein the computer-implemented method further comprises generating an assessment of monitoring maturity associated with the one or more monitoring objects over time based on analyzing a plurality of assessments of monitoring maturity associated with the one or more monitoring objects at a point in time.

17. The computer-implemented method of claim 14, wherein the one or more operational monitoring metric aspects comprise availability, capacity, performance, and integrity.

18. The computer-implemented method of claim 14, wherein the one or more target layers comprise one or more categories associated with the one or more monitoring objects, wherein the one or more categories comprise a device category, a network category, a data category, an application category, and a process category.

19. The computer-implemented method of claim 14, wherein the data object is a relational database table, wherein the first dimension is a first axis of the relational database table, wherein the second dimension is a second axis of the relational database table.

20. The computer implemented method of claim 14, wherein computing a monitoring score for each combination of the one or more operational monitoring metric aspects along the first dimension and the one or more target layers along the second dimension comprises computing a weighted score, wherein each operational monitoring indicator within each cell is assigned a weight according to the degree to which the operational monitoring indicator contributes to the monitoring of each of the one or more operational monitoring aspects.

* * * * *